United States Patent Office 3,097,926
Patented July 16, 1963

3,097,926
REMOVAL OF HYDROGEN SULPHIDE FROM GASES BY A WASH SOLUTION AND OXIDATION THEREIN TO FORM SULFUR
Thomas Nicklin and Anthony W. Sommerville, Manchester, England, assignors to North Western Gas Board, Manchester, England, a British corporation, and The Clayton Aniline Company Limited, Manchester, England, a British company
No Drawing. Filed Nov. 24, 1961, Ser. No. 154,815
Claims priority, application Great Britain Nov. 29, 1960
4 Claims. (Cl. 23—225)

This invention relates to the removal of hydrogen sulphide from gases consisting of hydrogen sulphide, or containing hydrogen sulphide in any proportion in conjunction with other gases such as carbon dioxide, carbon monoxide, hydrogen, aliphatic and aromatic hydrocarbons, organic sulphur compounds, oxygen and nitrogen, and from liquid or gaseous hydrocarbon mixtures.

According to the invention, the material containing hydrogen sulphide is washed with an aqueous alkaline solution containing a metal vanadate, a salt of a metal having at least two valency states, and at least one sequestering or chelating agent suitable for retaining such metal compounds in solution, whereby the hydrogen sulphide is oxidised, sulphur being liberated and the reduced vanadate is reoxidised by means of free oxygen or a gas containing it.

The metal vanadate may be used for example in the form of sodium metavanadate, sodium orthovanadate or sodium ammonium vanadate, and in the course of the reaction it is reduced, probably with formation of a vanadyl compound. It is used in a solution which may initially be made alkaline by adding sodium carbonate and bicarbonate or ammonia or other bases and having a pH value of above 7, the preferred value being from 8.5 to 9.5, in which the hydrogen sulphide is absorbed and subsequently oxidised, elemental sulphur being formed. It is preferably added in such quantity as to give a solution of concentration M/1000 to M/20.

A chelating or sequestering agent such as sodium potassium tartrate or other soluble tartrate or tartaric acid or ethylene diamine tetra acetic acid (referred to hereinafter as EDTA) is preferably added in sufficient quantity to complex a portion of the vanadate, in order to maintain the solubility of the vanadate in the presence of hydro sulphide.

Iron salts such as ferrous sulphate or ferric chloride or salts of copper, manganese, chromium, nickel and cobalt may be used as salts of metals having at least two valency states, the presence of such salts making it easy to regenerate the solution by means of air after the vanadate has been reduced. Such salts may be used in concentrations of M/1000 to M/100. In order to prevent precipitation of a metal such as iron in alkaline solution, EDTA or one of its derivatives, a tartrate or other suitable chelating agent is added.

By this process, coal gas, effluent air streams and other materials can be purified so as to be free from hydrogen sulphide, as shown by the following examples.

Example 1

In a laboratory apparatus consisting of three packed absorption columns, a reaction tank, an oxidising column and a header tank was introduced the absorption solution consisting of M/100 ferrous sulphate, M/100 sodium metavanadate, 2% total alkali, pH 9.0 (i.e. sodium carbonate, sodium bicarbonate in the ratio 1:2) and sufficient Rochelle salt (sodium potassium tartrate) to maintain the iron in solution under the given sulphide loading.

This apparatus was capable of purifying 10 cu. ft./hour of coal gas containing 700 grains hydrogen sulphide/100 cu. ft. so that the hydrogen sulphide at the outlet of the first column was 110 grains/100 cu. ft. The hydrogen sulphide at outlet of the second column was 15 grains/100 cu. ft. The hydrogen sulphide at the outlet of the third column was not detected by lead acetate paper.

Example 2

In a laboratory apparatus consisting of a single, packed washing column, a reaction tank and header tank but no separate oxidiser, was introduced a washing solution consisting of M/500 ferrous sulphate, M/500 sodium metavanadate, 2% total alkali, pH 9.0 (i.e. sodium carbonate, sodium bicarbonate in the ratio 1:2) and sufficient sodium potassium tartrate to maintain the iron in solution.

This apparatus was capable of purifying air containing 300 p.p.m. hydrogen sulphide so that the effluent air was free from hydrogen sulphide.

What is claimed is:
1. A process for the absorption and subsequent removal as sulphur of hydrogen sulphide from gas mixtures, in which the material containing hydrogen sulphide is washed with an aqueous alkaline solution containing a substance selected from the group consisting of ortho-, meta- and pyro-vanadates of ammonia and alkali metals, a salt of a metal selected from the group consisting of iron, copper, manganese, chromium, nickel and cobalt, and a sequestering agent for maintaining the metal salt in solution whereby the hydrogen sulphide is oxidized to form elemental sulphur and the vanadate in the solution is reduced, removing the elemental sulphur from the solution, and the reduced vanadate is oxidized by the use of free oxygen for recycling in the process.
2. A process as claimed in claim 1, in which the vanadate is present in a concentration of M/1000 to M/20.
3. A process as claimed in claim 1, in which the metal salt is present in a concentration of M/1000 to M/1000.
4. A process as claimed in claim 1, in which the solution has a pH of 8.5 to 9.5.

References Cited in the file of this patent

FOREIGN PATENTS

| | | |
|---|---|---|
| 230,268 | Australia | Sept. 20, 1960 |
| 280,165 | Great Britain | Oct. 15, 1928 |

OTHER REFERENCES

"Chemistry of the Metal Chelate Compounds," by Martell and Calvin, 1953 ed., pages 1, 2, 458, 493, 494 and 510–513 inclusive. Prentice-Hall, Inc., New York. Copy in U.S. Patent Office Scientific Library or Division 38.